US011486310B2

(12) United States Patent
Tomescu

(10) Patent No.: US 11,486,310 B2
(45) Date of Patent: Nov. 1, 2022

(54) SYSTEM AND METHOD FOR DYNAMIC ENGINE MOTORING

(71) Applicant: PRATT & WHITNEY CANADA CORP., Longueuil (CA)

(72) Inventor: Dana Tomescu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 213 days.

(21) Appl. No.: 16/895,527

(22) Filed: Jun. 8, 2020

(65) Prior Publication Data

US 2021/0301677 A1 Sep. 30, 2021

Related U.S. Application Data

(60) Provisional application No. 63/000,778, filed on Mar. 27, 2020.

(51) Int. Cl.
| | | |
|---|---|---|
| *F02C 7/268* | (2006.01) | |
| *F01D 19/02* | (2006.01) | |
| *F01D 25/34* | (2006.01) | |
| *F01D 21/00* | (2006.01) | |

(52) U.S. Cl.
CPC ............. *F02C 7/268* (2013.01); *F01D 19/02* (2013.01); *F01D 21/003* (2013.01); *F01D 25/34* (2013.01); *F05D 2220/323* (2013.01); *F05D 2260/85* (2013.01); *F05D 2270/02* (2013.01);
(Continued)

(58) Field of Classification Search
CPC .. F02C 7/26; F02C 7/268; F02C 7/275; F01D 21/04; F01D 21/08; F01D 25/34; F01D 25/36; F01D 19/00; F01D 19/02; F05D 2270/708
See application file for complete search history.

(56) References Cited

U.S. PATENT DOCUMENTS

| | | |
|---|---|---|
| 8,820,046 B2 | 9/2014 | Ross et al. |
| 9,664,070 B1 | 5/2017 | Clauson et al. |
| 9,988,987 B2 | 6/2018 | Mouze et al. |

(Continued)

FOREIGN PATENT DOCUMENTS

EP   3205843   1/2019

OTHER PUBLICATIONS

"CFM Details Leap Nozzle Coking Research, Potential Fixes" by Chris Kjelgaard, Jun. 17, 2019 (https://www.ainonline.com/aviation-news/air-transport/2019-06-17/cfm-detalls-leap-nozzle-coking-research-potential-fixes).

*Primary Examiner* — Alain Chau
(74) *Attorney, Agent, or Firm* — Norton Rose Fulbright Canada LLP

(57) ABSTRACT

There is provided a dynamic motoring system and method for an aircraft engine. Motoring of the engine is initiated for an initial motoring duration and at an initial motoring interval. At least one engine parameter is measured in real-time during the motoring, the at least one engine parameter comprising a temperature of the engine. The initial motoring duration and the initial motoring interval are modified in real-time, based on a value of the at least one engine parameter during the motoring, to obtain a modified motoring duration and a modified motoring interval. The motoring continues for the modified motoring duration and at the modified motoring interval, with a speed of rotation of the engine being controlled using the modified motoring interval.

14 Claims, 6 Drawing Sheets

(52) U.S. Cl.
CPC .. *F05D 2270/303* (2013.01); *F05D 2270/334* (2013.01); *F05D 2270/708* (2013.01)

(56) References Cited

U.S. PATENT DOCUMENTS

| | | | |
|---|---|---|---|
| 10,040,577 B2 | 8/2018 | Teicholz et al. | |
| 10,125,690 B2 | 11/2018 | Zaccaria et al. | |
| 10,125,691 B2 | 11/2018 | Feulner et al. | |
| 10,174,678 B2 | 1/2019 | Schwarz et al. | |
| 10,443,505 B2 | 10/2019 | Virtue, Jr. et al. | |
| 10,443,507 B2 | 10/2019 | Schwarz et al. | |
| 10,502,139 B2 * | 12/2019 | Ross | F02C 3/04 |
| 10,781,754 B2 * | 9/2020 | Chiasson | F01D 25/34 |
| 11,073,086 B2 * | 7/2021 | Brown | F01D 25/34 |
| 11,162,382 B2 * | 11/2021 | Comandore | B64D 27/10 |
| 2014/0123673 A1 * | 5/2014 | Mouze | F01D 19/02 |
| | | | 60/778 |
| 2016/0348588 A1 * | 12/2016 | Ross | F02C 9/00 |
| 2017/0234167 A1 | 8/2017 | Stachowiak et al. | |
| 2017/0234230 A1 | 8/2017 | Schwarz et al. | |
| 2017/0234231 A1 | 8/2017 | Virtue, Jr. et al. | |
| 2017/0234232 A1 | 8/2017 | Sheridan et al. | |
| 2017/0234233 A1 | 8/2017 | Schwarz et al. | |
| 2017/0234235 A1 | 8/2017 | Pech | |
| 2017/0234238 A1 | 8/2017 | Schwarz et al. | |
| 2017/0335714 A1 * | 11/2017 | Popescu | F01D 25/24 |
| 2017/0335768 A1 | 11/2017 | Steen et al. | |
| 2017/0335865 A1 | 11/2017 | Steen | |
| 2017/0342908 A1 * | 11/2017 | Hon | F01D 25/34 |
| 2017/0363012 A1 | 12/2017 | Clauson et al. | |
| 2018/0010480 A1 | 1/2018 | Hockaday et al. | |
| 2018/0023479 A1 | 1/2018 | Clauson et al. | |
| 2018/0142623 A1 | 5/2018 | Chiabrando et al. | |
| 2018/0283197 A1 | 10/2018 | Jackowski et al. | |
| 2018/0306065 A1 | 10/2018 | Keenan et al. | |
| 2018/0334963 A1 | 11/2018 | Fernholz | |
| 2018/0355764 A1 | 12/2018 | Clauson et al. | |
| 2019/0040799 A1 | 2/2019 | Gelwan et al. | |
| 2019/0178165 A1 | 6/2019 | Chiasson et al. | |
| 2019/0186368 A1 | 6/2019 | Sharma et al. | |
| 2020/0165976 A1 * | 5/2020 | Brown | F01D 25/10 |
| 2020/0271011 A1 * | 8/2020 | Comandore | F01D 21/00 |

\* cited by examiner

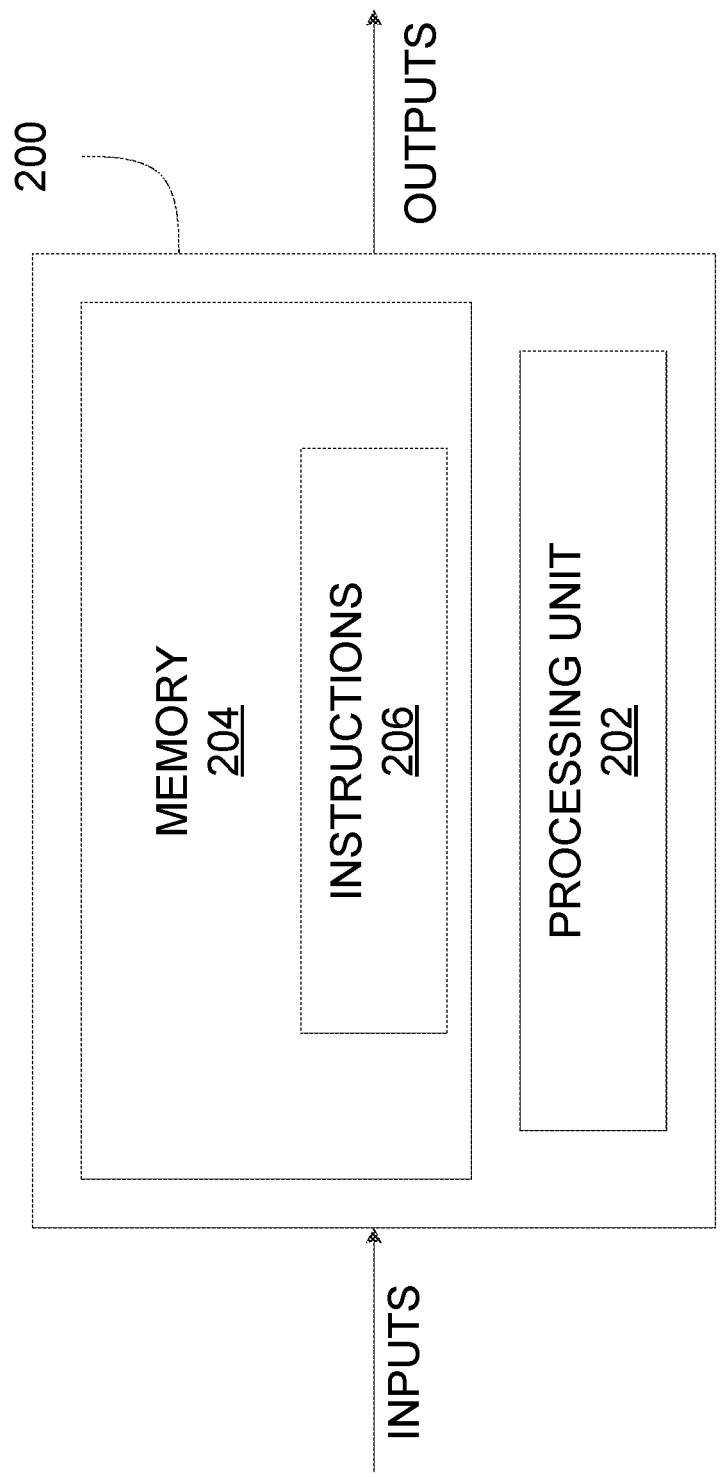

SYSTEM AND METHOD FOR DYNAMIC ENGINE MOTORING

CROSS REFERENCE TO RELATED APPLICATIONS

This patent application claims priority of U.S. provisional Application Ser. No. 63/000,778, filed on Mar. 27, 2020, the entire contents of which are hereby incorporated by reference.

TECHNICAL FIELD

The application relates generally to gas turbine engines and, more particularly, to rotor bow mitigation for a gas turbine engine.

BACKGROUND OF THE ART

Following shutdown of a gas turbine engine, residual heat is trapped in the engine core. As the temperature of the engine decreases towards ambient temperature, a thermal gradient develops in the engine leading to the upper portion of the engine cooling more slowly than the lower portion. This results in distortion (or bowing) of the engine components due to thermal expansion (or contraction). Damage can be caused to the engine if the engine rotors are spooled up while in a bowed state. It is also undesirable to restart the engine until the engine cools and the rotor bow dissipates to an acceptable level.

As such, there is need for improvement.

SUMMARY

In one aspect, there is provided a dynamic motoring method for an aircraft engine, the method comprising, at a processing device, initiating motoring of the engine for an initial motoring duration and at an initial motoring interval, measuring at least one engine parameter in real-time during the motoring, the at least one engine parameter comprising a temperature of the engine, modifying in real-time, based on a value of the at least one engine parameter during the motoring, the initial motoring duration and the initial motoring interval to obtain a modified motoring duration and a modified motoring interval, and continuing the motoring for the modified motoring duration and at the modified motoring interval, the continuing comprising controlling a speed of rotation of the engine using the modified motoring interval.

In another aspect, there is provided a dynamic motoring system for an aircraft engine, the system comprising, at a processing device, a memory and a processing unit coupled to the memory and configured for initiating motoring of the engine for an initial motoring duration and at an initial motoring interval, measuring at least one engine parameter in real-time during the motoring, the at least one engine parameter comprising a temperature of the engine, modifying in real-time, based on a value of the at least one engine parameter during the motoring, the initial motoring duration and the initial motoring interval to obtain a modified motoring duration and a modified motoring interval, and continuing the motoring for the modified motoring duration and at the modified motoring interval, the continuing comprising controlling a speed of rotation of the engine using the modified motoring interval.

In a further aspect, there is provided a non-transitory computer readable medium having stored thereon program code executable by a processor for initiating motoring of an aircraft engine for an initial motoring duration and at an initial motoring interval, measuring at least one engine parameter in real-time during the motoring, the at least one engine parameter comprising a temperature of the engine, modifying in real-time, based on a value of the at least one engine parameter during the motoring, the initial motoring duration and the initial motoring interval to obtain a modified motoring duration and a modified motoring interval, and continuing the motoring for the modified motoring duration and at the modified motoring interval, the continuing comprising controlling a speed of rotation of the engine using the modified motoring interval.

DESCRIPTION OF THE DRAWINGS

Reference is now made to the accompanying figures in which:

FIG. 2 is a block diagram of a computing device for implementing the control unit of FIG. 1B, in accordance with an illustrative embodiment;

DETAILED DESCRIPTION

Figure 1A:
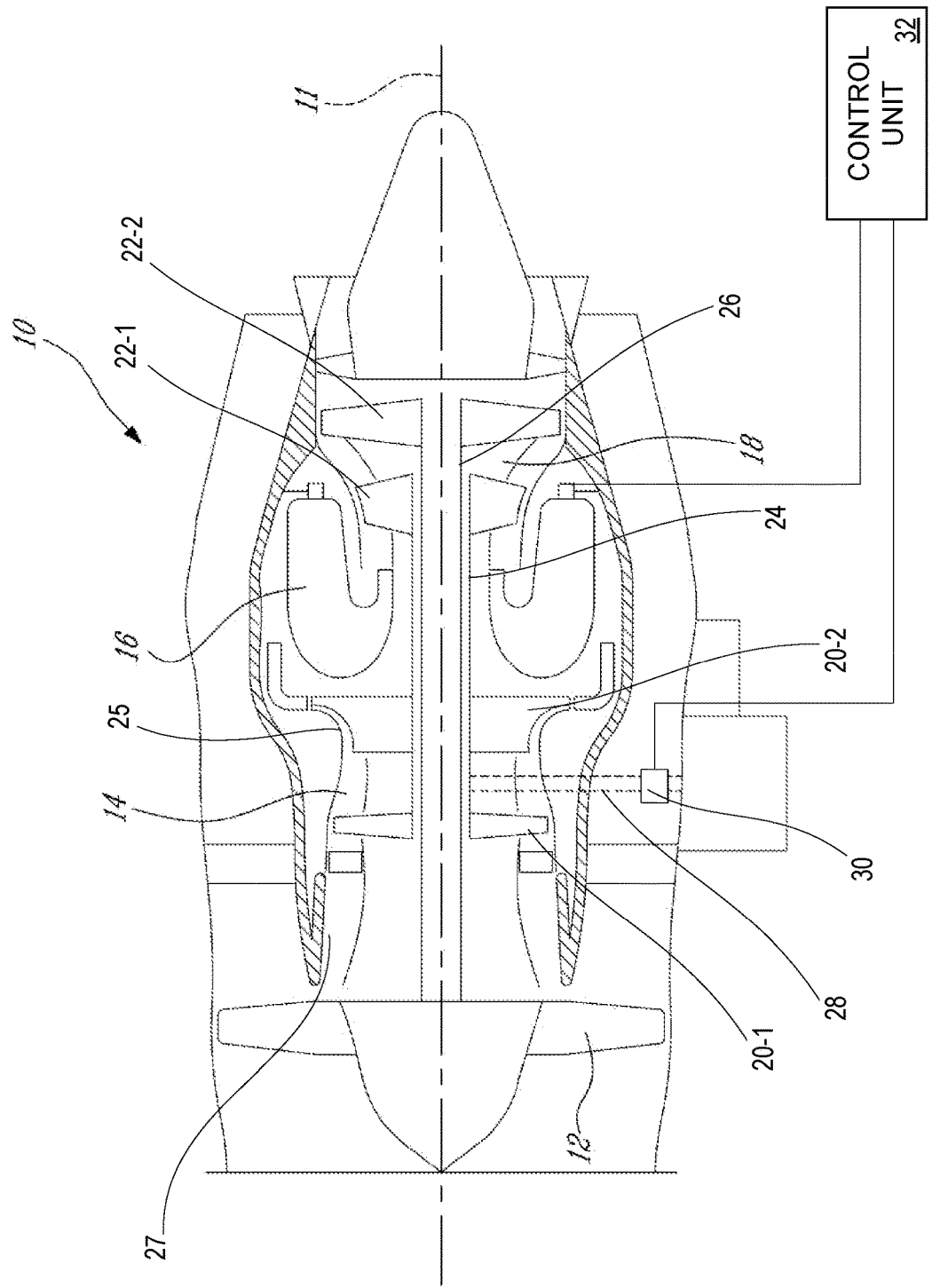
FIG. 1A is a schematic cross-sectional view of a gas turbine engine.

FIG. 1A illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Compressor section 14 includes compressors 20, namely, a low-pressure compressor 20-1 and a high-pressure compressor 20-2. Turbine section 18 includes turbines 22, namely, a high-pressure turbine 22-1 and a low-pressure turbine 22-2.

Fan 12, compressors 20 and turbines 22 are mounted to shafts 24, 26 for rotation about a longitudinal axis 11. Low-pressure compressor 20-1, high-pressure compressor 20-2 and high-pressure turbine are mounted to a common first shaft 24, and may be collectively referred to as a high-speed spool or high-speed rotor assembly. Fan 12 and low-pressure turbine 22-2 are mounted to a common second shaft 26 and may be collectively referred to as a low-speed spool or low-speed rotor assembly. During operation, compressors 20 and combustor 16 provide a stream of high-temperature and high-pressure gas to turbines 22, causing turbines 22 to rotate. Rotation of turbines 22 drives rotation of compressors 20 and fan 12 by way of shafts 24, 26.

Engine 10 has an air starter 28 for inducing direct rotation of the high-speed and indirect rotation of the low-speed rotor assemblies at engine start-up. Air starter 28 is provided with a supply of pressurized air from an independent unit. Flow of air to starter 28 is modulated by a starter valve (also referred to as a starter air valve) 30.

Starter valve 30 is solenoid-actuated and operated (e.g. engaged) by a signal from a control unit 32. Control unit 32 is in communication with one or more aircraft systems (not shown), which may include, but are not limited to, flight controls, electric systems, auxiliary power units, and the like, as well as with aircraft avionics (not shown), which may include any and all systems related to control and management of the aircraft, such as but not limited to communications, navigation, display, monitoring, flight-control systems, collision-avoidance systems, flight recorders, weather systems, and aircraft management system. The control unit 32 is also in communication with the cockpit of the aircraft (reference 106 in FIG. 1B) as well as with a plurality of control elements and one or more aircraft sensors 108, such as a throttle, speed, vibration, and temperature sensors, and the like, configured to acquire measurements (or readings) of given parameters.

While the engine 10 is illustrated and described herein as using a starter valve 30 and an air starter 28 for inducing rotation of the engine 10, it should be understood that other embodiments may apply. The systems and methods described herein may apply to engines as in 10 that use any suitable means of providing rotational power to the engine, including, but not limited to, an air turbine starter, a starter air valve, a pneumatic starter motor, a starter generator, and an electric motor.

In addition, while the engine 10 is illustrated and described herein as being a turbofan engine, it should be understood that this is for illustration purposes only. The systems and methods described herein may apply to any suitable type of engine including, but not limited to, a turbofan engine, a geared turbofan engine, a turboprop engine, a turboshaft engine, an auxiliary power unit, an electric engine, and a hybrid electric propulsion system.

Referring back to FIG. 1A, during operation of engine 10, pressurization of air by compressors 20 and fuel combustion in combustor 16 produce high temperatures, particularly in the combustor 16 and turbine section 18. Temperatures may depend on the operating state of engine 10, among other conditions. For example, high-thrust operation, such as high-speed cruising, may rely on high rates of fuel combustion, which may produce relatively high temperatures in turbine 18. Conversely, other operating states may require less thrust and thus may entail combustion of lower quantities of fuel. For example, while taxiing, (e.g. on a runway), fuel is combusted at a much lower rate, and less heat is introduced to engine 10.

High temperatures within engine 10 may persist for a period of time after engine shutdown. For example, airflow through engine 10 substantially ceases after engine 10 is shut down and air tends to stagnate within the core of engine 10. Thus, heat dissipates relatively slowly from the high operating temperatures of components.

While engine 10 is shut down, temperature distribution within the engine 10 may be asymmetrical. For example, relatively cool and dense air may settle toward the bottom of the engine 10. Conversely, hotter and less dense air may rise toward the top of the engine 10, resulting in a temperature profile that generally increases from bottom to top. In other words, components near the top of engine 10 may tend to remain hotter than components near the bottom of engine 10.

As noted, components of engine 10 may experience thermal expansion when subjected to elevated temperatures. Following engine shutdown, thermal contraction may be non-uniform, due to temperature profiles within engine 10. As the temperature of a given rotor decreases towards ambient temperature, a thermal gradient develops in the rotor leading to an upper portion of the rotor cooling more slowly than a lower portion of the rotor. This results in distortion (or bowing) within the engine, which prevents the use of the aircraft for a certain period of time (referred to as a 'lock-out time') until the engine 10 has cooled down. Bowing of the engine case may also occur, resulting in a reduction in normal build clearances and leading to potential rubbing between the engine's rotating turbomachinery and the closed-down case structure of the engine 10. The rub condition can in turn cause a hung start or performance loss for the engine 10.

Figure 1B:
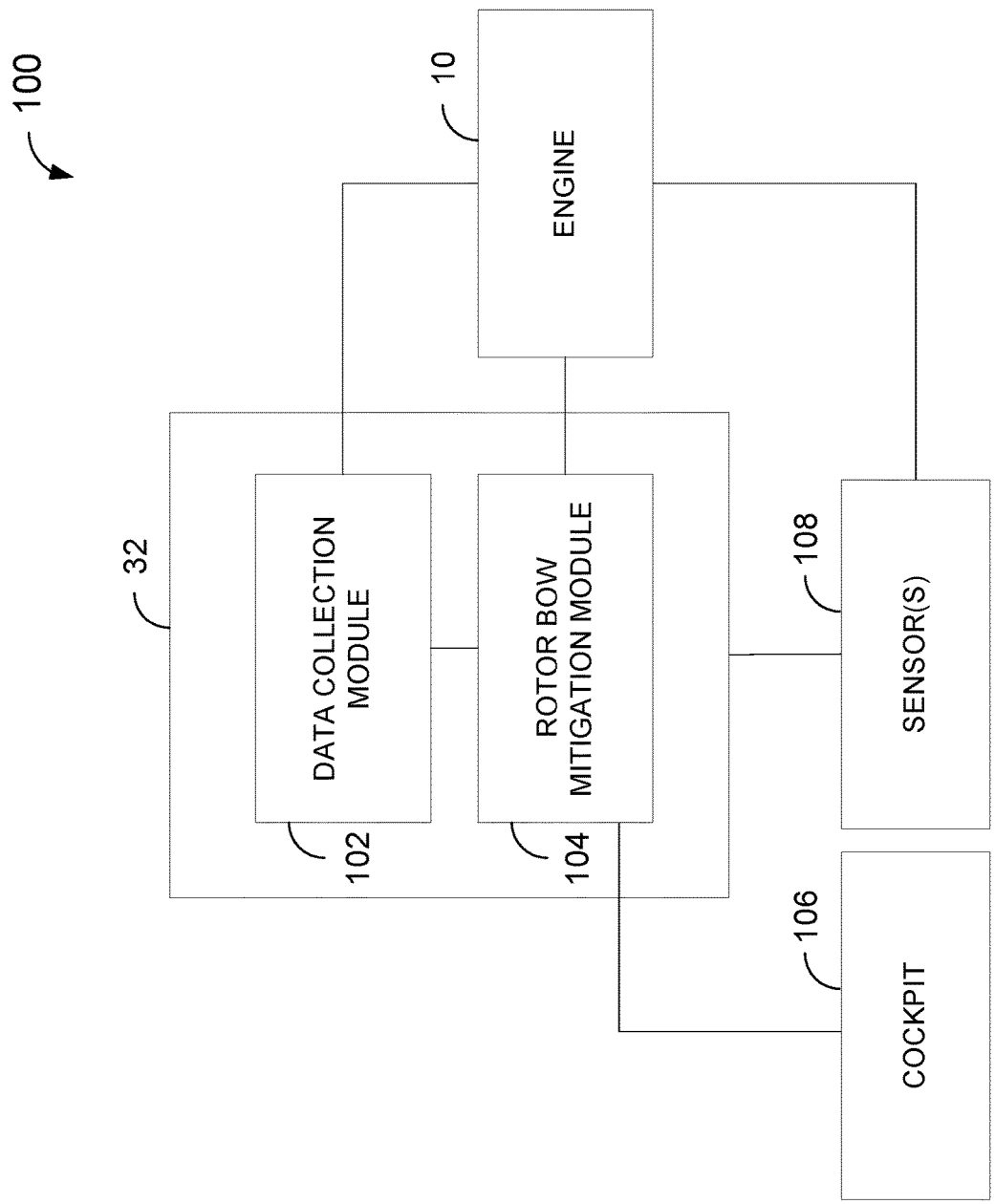
FIG. 1B is a block diagram of a system for dynamic engine motoring, in accordance with an illustrative embodiment.

FIG. 1B illustrates an example system 100 for dynamic engine motoring for the engine 10 of FIG. 1A. The system 100 comprises the control unit 32, which controls operation of the engine 10, and particularly operation (e.g., opening and closing) of the starter valve (reference 30 in FIG. 1A) that modulates the flow of air to the starter (reference 28 in FIG. 1A) and induces rotation of the engine's rotor assemblies. In one embodiment, the control unit 32 is an Electronic Engine Controller (EEC) and comprises a data collection module 102 and a rotor bow mitigation module 104.

The rotor bow mitigation module 104 is configured to perform a motoring procedure or sequence (i.e. 'motor' the engine 10) for alleviating (e.g., reducing) rotor distortion (or bowing) for the engine 10. In one embodiment, the motoring procedure is performed for a given motoring duration (also referred to herein as a motoring time) and at a given motoring interval, prior to a start sequence being initiated for the engine 10. As understood by those skilled in the art, the start sequence comprises a number of successive steps (e.g., cranking of the engine 10, ignition of the engine 10, supply of fuel to the engine 10, acceleration, thermal soak at ground idle) and, when initiated, brings the engine 10 to ground idle. In particular, upon detecting a start indication (indicative of a requested or commanded initiation of the start sequence) of the engine 10, the rotor bow mitigation module 104 rotates the engine 10 below a rotational speed which adversely affects the engine 10 (e.g., at a speed lower than the resonant speed of the engine's rotor), for the given motoring duration and at the given motoring interval.

In one embodiment, depending on the value of the motoring interval, the rotor bow mitigation procedure involves running the engine 10 at a continuous (e.g., predetermined constant or increasing) rotational speed, for the motoring duration. For example, the rotor bow mitigation module 104 may set the value of the motoring interval to zero (0) and accordingly run the engine 10 at a constant speed, for the motoring duration. In another embodiment where the value of the motoring interval is non-zero, the rotor bow mitigation procedure involves running the engine 10 at a discontinuous speed of rotation, where the rotor bow mitigation module 104 increases and decreases (to pre-determined levels) the rotational speed of the engine 10, for the motoring duration. As such, in one embodiment, the motoring interval may refer to the period of time (or frequency) between the application of rotational speed that defines the engine's revolutions per minute. In another embodiment, the motoring interval may refer to the device that provides rotational power to the engine 10. For instance, the motoring interval may refer to the open and closing interval of the starter valve (reference 30 in FIG. 1A) or to the commanded on/off power from an electric motor that provides rotational power to the engine 10.

The data collection module 102 is configured to collect and store (referred to herein as 'tracking') engine parameter(s) in real-time, while the motoring procedure is being performed. As will be discussed further below, the motoring procedure is initiated for a pre-determined motoring duration (referred to herein as an 'initial motoring duration' $d_i$) and at a pre-determined motoring interval (referred to herein as an 'initial motoring interval' $i_i$). The initial motoring duration and/or interval are then dynamically adjusted by the rotor bow mitigation module 104 during the motoring procedure, based on the real-time values of the engine parameter(s) tracked by the data collection module 102. In one embodiment, both the motoring duration and the motoring interval are adjusted in real-time, as illustrated and described herein. It should however be understood that, in some embodiments, only one of the motoring duration and the motoring interval may be adjusted. By controlling the motoring interval, the rotor bow mitigation module 104 may in turn control the speed of the engine 10 (e.g., as obtained from an N1 or N2 speed signal received from the engine 10, N1 being the engine's fan speed and N2 being the rotational speed of the engine's core compressor spool).

In one embodiment, the data collection module 102 is configured to continually track the engine parameter(s). The data collection module 102 may also be configured to track the engine parameter(s) for a given time period. For example, the data collection module 102 may sample measurements periodically, such as every 5 seconds, every 10 seconds, every 20 seconds, or any other suitable time interval. In one embodiment, the data collection module 102 is configured to sample the tracked engine parameter(s) such that the reading is indicative of a steady state value for the parameter(s), rather than a transient value which may not be representative of the true value of the parameter(s). The data collection module 102 is then configured to send the collected (or tracked) data to the rotor bow mitigation module 104, which is configured to adjust, based on the received data and using a motoring duration modifier and a motoring interval modifier, the initial motoring duration and the initial motoring interval to obtain a modified motoring duration and a modified motoring interval (as will be discussed further below). In particular, if the tracked engine parameter(s) are not within a pre-determined range, the motoring duration and/or the motoring interval are adjusted until the engine parameter(s) are within range.

In one embodiment, the engine parameter(s) tracked by the data collection module 102 include an internal temperature of the engine 10 (referred to herein as an 'internal engine temperature' parameter). It should however be understood that, in some embodiments, the internal engine temperature parameter may not be tracked (i.e. as a rolling maximum engine temperature) but may instead be measured in situ. The data collection module 102 may be configured to receive, from the sensor(s) 108, one or more measurements indicative of the internal engine temperature. In one embodiment, the sensor(s) 108 are configured to measure and transmit to the data collection module 102 one or more measurements such as the Turbine Inlet Temperature (TIT), the Interstage Turbine Temperature (ITT), the Exhaust Gas Temperature (EGT), and/or any other suitable temperature parameter(s) indicative of an internal temperature of the engine 10. The temperature measured at the sensor(s) 108 is sent to the data collection module 102 and the average (or highest) temperature measured at the sensor(s) 108 may be used by the rotor bow mitigation module 104.

In addition to the internal engine temperature parameter, additional parameters may be used to dynamically adjust the motoring duration and/or the motoring interval in real-time. For example, the data collection module 102 may be configured to receive from the sensor(s) 108 (e.g., from vibration sensor(s) or accelerometer(s)) measurement(s) indicative of vibration level(s) of the engine 10. The rotor bow mitigation module 104 may then adjust the motoring duration and the motoring interval based on the vibration levels, with temperature being used as the primary parameter for adjusting the motoring duration and/or interval and vibration being used as a secondary parameter to further adjust (e.g., increase) the motoring duration and/or interval if needed. For instance, if vibration levels increase past a predetermined speed threshold, the engine's speed may be reduced and the motoring duration increased until the engine's speed is safely increased without unacceptable vibration levels that may cause damage. The data collection module 102 may also be configured to receive from the sensor(s) 108 (e.g., from clearanceometer(s) or proximity probe(s)) gap measurements indicative of the critical clearance between the engine rotor(s) and the engine case. In this embodiment, the engine 10 may only be started safely (without rubbing of the rotating components) when the clearance is within a predetermined target range. It should be understood that any suitable engine parameter(s), which can be relevant for the purpose of determining and dynamically adjusting the motoring duration and/or interval (as changes in such parameters would reflect rotor bow changes in real-time), may be measured and/or tracked by the data collection module 102.

The data collection module 102 may comprise a timer used to track the engine parameter(s). In one embodiment, the timer may be used to track elapsed time since the start of the motoring procedure, such that the value of the elapsed time can be used subsequently. Using the timer, the correct dynamic motoring adjustments may be obtained. It should however be understood that suitable means of tracking the engine parameter(s) other than a timer may be used. For example, in one embodiment, timestamps may be used.

As stated previously, the rotor bow mitigation module 104 illustratively uses the data received from the data collection module 102 to modify the initial motoring duration and the initial motoring interval for the engine 10. In particular, the initial motoring duration and/or interval are adjusted in real-time according to the engine parameter(s). If the engine parameter(s) are not within a pre-determined range, the initial motoring duration and the initial motoring interval are adjusted until the engine parameter(s) are within range. For example, if the engine temperature has decreased more rapidly than predicted, the motoring duration can be decreased accordingly to reduce overall lock-out time.

Adjustment of the initial motoring duration and/or interval may be achieved by querying one or more lookup tables (or other suitable data structure), which provide, for each engine parameter and as a function of the possible values of the engine parameter, one or more values for a motoring duration modifier used to modify the initial motoring duration and one or more values for a motoring interval modifier used to modify the initial motoring interval. The modifier values may be positive or negative integers, meaning that a given modifier may either result in an increase or a decrease of the corresponding parameter (i.e. motoring duration or motoring interval) it is applied to. For example, if a positive motoring interval modifier is applied to the initial motoring interval (using equation (4) below), the resulting modified motoring interval will be greater than the initial motoring interval. If a negative motoring interval modifier is applied to the initial motoring interval, the modified motoring interval will be smaller than the initial motoring interval. In one embodiment where the engine parameter is the engine temperature, the motoring duration and/or interval modifiers may be negative integers for lower temperatures, in order to reduce the overall lock-out time by decreasing overall motoring time, while the motoring duration and/or interval modifiers may be positive integers for higher temperatures, in order to ensure sufficient motoring time at these higher temperatures. It should however be understood that, in some embodiments, the value of at least one of the modifiers may be set to zero. For instance, if a motoring interval modifier having a value of zero is applied to the initial motoring interval, the modified motoring interval will be equal to the initial motoring interval.

The lookup table(s) may be pre-calculated and stored in memory for subsequent access. In one embodiment, the lookup table(s) are determined via engine testing and analysis to determine the modified motoring duration and/or interval suitable to alleviate rotor bow, depending on the value(s) of the engine parameter(s) being tracked. Table 1 below is an example of a lookup table, where the engine parameter is the engine's temperature. This example is for illustration purposes only. It should be understood that the number of engine parameter(s) tracked by the data collection module 102 may vary and that the number of lookup tables may also vary accordingly. As such, lookup tables (and corresponding values) other than the one illustrated and described herein may apply.

Table 1 below illustrates example values of the motoring duration modifier ($n_n$) and the motoring interval modifier ($t_n$) as a function of the engine's temperature ($Temp_n$).

TABLE 1

| Temperature ($Temp_n$) | Motoring duration modifier ($n_n$) | Motoring interval modifier ($t_n$) |
|---|---|---|
| $Temp_1$ | $\pm n_1$ | $\pm t_1$ |
| $Temp_2$ | $\pm n_2$ | $\pm t_2$ |
| ... | ... | ... |
| $Temp_n$ | $\pm n_n$ | $\pm t_n$ |

In one embodiment, the engine temperature parameter ($Temp_n$) is computed as a difference (or delta) between the actual engine temperature ($Temp_{actual}$), as measured by the sensor(s) 108, and a predicted engine temperature ($Temp_{predicted}$), which is in one embodiment the expected engine temperature based on a predetermined cooling rate for the engine 10, as follows:

$$Temp_n = Temp_{predicted} - Temp_{actual} \quad (1)$$

In one embodiment, the engine temperature (Temp predicted) is predicted based on engine testing and analysis which determines the rate of change of the engine temperature (i.e. the pre-determined cooling rate). In order to obtain the predicted engine temperature, the pre-determined cooling rate can be multiplied with the elapsed time or alternatively retrieved from a look-up table. Therefore, the pre-determined cooling rate is applied to predict the temperature at a certain time. For example, let the pre-determined cooling rate be 2 degrees Celsius per second and assume the motoring procedure is performed for 10 seconds. After 10 seconds, based on pre-determined cooling rate of 2 degrees Celsius per second, the engine temperature is predicted to have dropped 20 degrees Celsius (using $Term_{predicted}$=elapsed duration×cooling rate=10 seconds×2 degrees Celsius/second=20 degrees Celsius). If, after 10 seconds, the engine temperature is measured and found to have dropped 15 degrees Celsius (i.e. $Term_{actual}$=15 degrees Celsius), then the predicted engine temperature is: $Temp_{predicted} - Temp_{actual} = 20 - 15 = 5$ degrees Celsius. A positive duration modifier of 2.5 seconds may then be applied to increase motoring time.

In another embodiment, the engine temperature parameter is computed as a ratio ($Temp_{ratio}$) between the rate of change of the predicted engine temperature and the rate of change of the actual engine temperature, which is used as a multiplier to increase or decrease the motoring duration, as follows:

$$Temp_{ratio} = \Delta Temp_{predicted} / \Delta Temp_{actual} \quad (2)$$

The rotor bow mitigation module 104 is configured to perform a correlation between the tracked engine parameter(s) (e.g., the engine temperature $Temp_n$) and the lookup table(s) (e.g., Table 1) in order to obtain values of the motoring duration modifier and the motoring interval modifier. For example, the data collection module 102 may send to the rotor bow mitigation module 104 measurements indicating that the engine temperature is $Temp_2$. The rotor bow mitigation module 104 may then obtain, upon correlating the engine temperature ($Temp_2$) measurement with Table 1, a value of $n_2$ (positive or negative, depending on the embodiment) for the motoring duration modifier and a value of $t_2$ (positive or negative, depending on the embodiment) for the motoring interval modifier.

The rotor bow mitigation module 104 may then compute the modified motoring duration as follows:

$$d_d = (d_i - d_e) + n_n \quad (3)$$

where $d_d$ is the modified (or dynamic) motoring duration, $d_i$ is the initial motoring duration, $d_e$ is the elapsed duration since the motoring procedure has been initiated, and $n_n$ is the motoring duration modifier corresponding to engine parameter $Temp_n$ (as obtained from the lookup table).

It should be understood that, in one embodiment, the initial motoring duration may be determined in the manner described in U.S. Provisional Patent Application No. 63/000,725, filed on Mar. 27, 2020 and U.S. patent application Ser. No. 16/895,223, filed on Jun. 8, 2020, which are incorporated herein by reference in their entirety. In another embodiment, the initial motoring duration may be a time estimate specific to the application and engine configuration (e.g., engine materials and respective coefficients of thermal expansion, cooling rates, and the like) and may represent the minimum motoring duration for which it is desirable to perform the motoring procedure, in the best case scenario. In this embodiment, the initial motoring duration may be a default value referred to as a standard duration ($d_{std}$). The formula of equation (3) then changes to $d_d = (d_{std} - d_e) + (n_n)$. Once specified, the standard duration value $d_{std}$ may be stored in memory and retrieved therefrom by the rotor bow mitigation module 104 to perform the computations described herein.

The rotor bow mitigation module 104 may also compute the modified motoring interval as follows:

$$i_d = i_i + t_n \quad (4)$$

where $i_d$ is the modified (or dynamic) motoring interval, $i_i$ is the initial motoring interval, and $t_n$ is the motoring interval modifier corresponding to engine parameter $Temp_n$ (as obtained from the lookup table).

The initial motoring interval may be specified according to the application and engine configuration and may represent the optimal motoring interval. The initial motoring interval may be a default interval and in some embodiments may be zero in order to obtain continuous rotational speed. Once specified, the value of $i_i$ may be stored in memory and retrieved therefrom by the rotor bow mitigation module 104 to perform the computations described herein.

It should however be understood that equations other than equations (1), (2), (3), and (4) above may apply. For example, the computation for the modified motoring duration and the modified motoring interval may be combined in a single formula. Alternatively, the engine temperature parameter may be calculated as $Temp_n = Temp_{actual} - Temp_{predicted}$. In some embodiments, multipliers may also be used to determine the modified motoring duration and/or interval.

As previously mentioned, upon detecting a start indication of the engine 10 (e.g., upon receipt of a commanded engine start), the rotor bow mitigation module 104 causes the motoring procedure to be initiated. In particular, motoring of the engine 10 is initiated for the initial motoring duration and at the initial motoring interval. For this purpose, the rotor bow mitigation module 104 may, upon receipt of the commanded engine start, send one or more signals to the engine 10 to cause the motoring procedure to be automatically initiated. Alternatively, the rotor bow mitigation module 104 may send a message (i.e. a motoring command) to the cockpit (reference 106 in FIG. 1B), via any suitable cockpit interface, to command motoring. The message may comprise an indication of the initial motoring duration and the initial motoring interval. If the rotor bow mitigation module 104 receives (using any interface in the cockpit, for example discrete inputs from a button press or a long hold for added protection against inadvertent selection) an indication that the pilot has rejected the motoring command, the rotor bow mitigation module 104 may then abort the motoring procedure in which case the engine start is also aborted. Otherwise, if the rotor bow mitigation module 104 receives an indication that the pilot has accepted the motoring command, the rotor bow mitigation module 104 may then cause the engine 10 to run the motoring sequence for the initial motoring duration and at the initial motoring interval, prior to a start of the engine 10. Although not illustrated, it should be understood that, in one embodiment, the rotor bow mitigation module 104 may also send a message to the cockpit (reference 106 in FIG. 1B), via any suitable cockpit interface, to provide an indication that motoring is taking place. The motoring duration may optionally be displayed.

In one embodiment, the initial motoring duration and the initial motoring interval are pre-determined values that may be specified according to the application and engine configuration and stored in memory, as described herein above.

As the motoring procedure is being performed, the rotor bow mitigation module 104 dynamically adjusts the motoring procedure in real-time, based on the real-time engine parameter measurements and using the modified motoring duration and the modified motoring interval, in the manner described herein above. In particular, the rotor bow mitigation module 104 causes the motoring procedure to be performed for the modified motoring duration and at the modified motoring interval (i.e. instead of carrying on with the motoring procedure for the initial motoring duration and at the initial motoring interval).

The rotor bow mitigation module 104 may then constantly monitor the status of the engine 10 in order to determine whether the motoring sequence has been completed (e.g., whether the modified motoring duration has elapsed). Once this is the case, the rotor bow mitigation module 104 may then send a corresponding message to the cockpit 106 (via the cockpit interface).

In one embodiment, the motoring procedure may be automatically ended once a maximum motoring duration (or a corresponding timer) has elapsed. In another embodiment, the motoring procedure may be aborted by the pilot at any time. For example, the motoring procedure may be aborted by commanding an engine shutdown, e.g. following a pilot-initiated or an EEC-initiated motoring abort command. The motoring procedure may also be aborted when the control unit 32 detects a failure or exceedance of one or more engine rotation speed sensors. For instance, the motoring procedure may be aborted by commanding an engine shutdown when speed is less than a first speed threshold for a given time period (e.g. 20 seconds), speed is less than the first threshold for a given time interval (e.g. 2 seconds) after speed has transitioned above the first threshold, speed has exceeded a second speed threshold, or there is no valid engine rotation speed sensor signal after a given time interval (e.g. 10 seconds) has elapsed since the starter valve (reference 30 in FIG. 1A) has been commanded open. In one embodiment, the first threshold corresponds to a low speed abort threshold, where the motoring procedure is aborted in the event the engine does not perform as expected (e.g. is not able to govern). In one embodiment, the second speed threshold is a threshold set to protect the rotor from approaching a resonant speed. It should also be understood that the motoring procedure may also be aborted if other component failure indications or emergency situations, such as fire, occur during the motoring procedure.

FIG. 2 is an example embodiment of a computing device 200 for implementing the control unit 32 described above with reference to FIG. 1B. The computing device 200 comprises a processing unit 202 and a memory 204 which has stored therein computer-executable instructions 206. The processing unit 202 may comprise any suitable devices configured to cause a series of steps to be performed such that instructions 206, when executed by the computing device 200 or other programmable apparatus, may cause the functions/acts/steps described herein to be executed. In one embodiment, the processing unit 202 has the ability to interpret discrete inputs and energize discrete outputs. The processing unit 202 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 204 may comprise any suitable known or other machine-readable storage medium. The memory 204 may comprise non-transitory computer readable storage medium, for example, but not limited to, an electronic, magnetic, optical, electromagnetic, infrared, or semiconductor system, apparatus, or device, or any suitable combination of the foregoing. The memory 204 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 204 may comprise any storage means (e.g., devices) suitable for retrievably storing machine-readable instructions 206 executable by processing unit 202.

Figure 3:
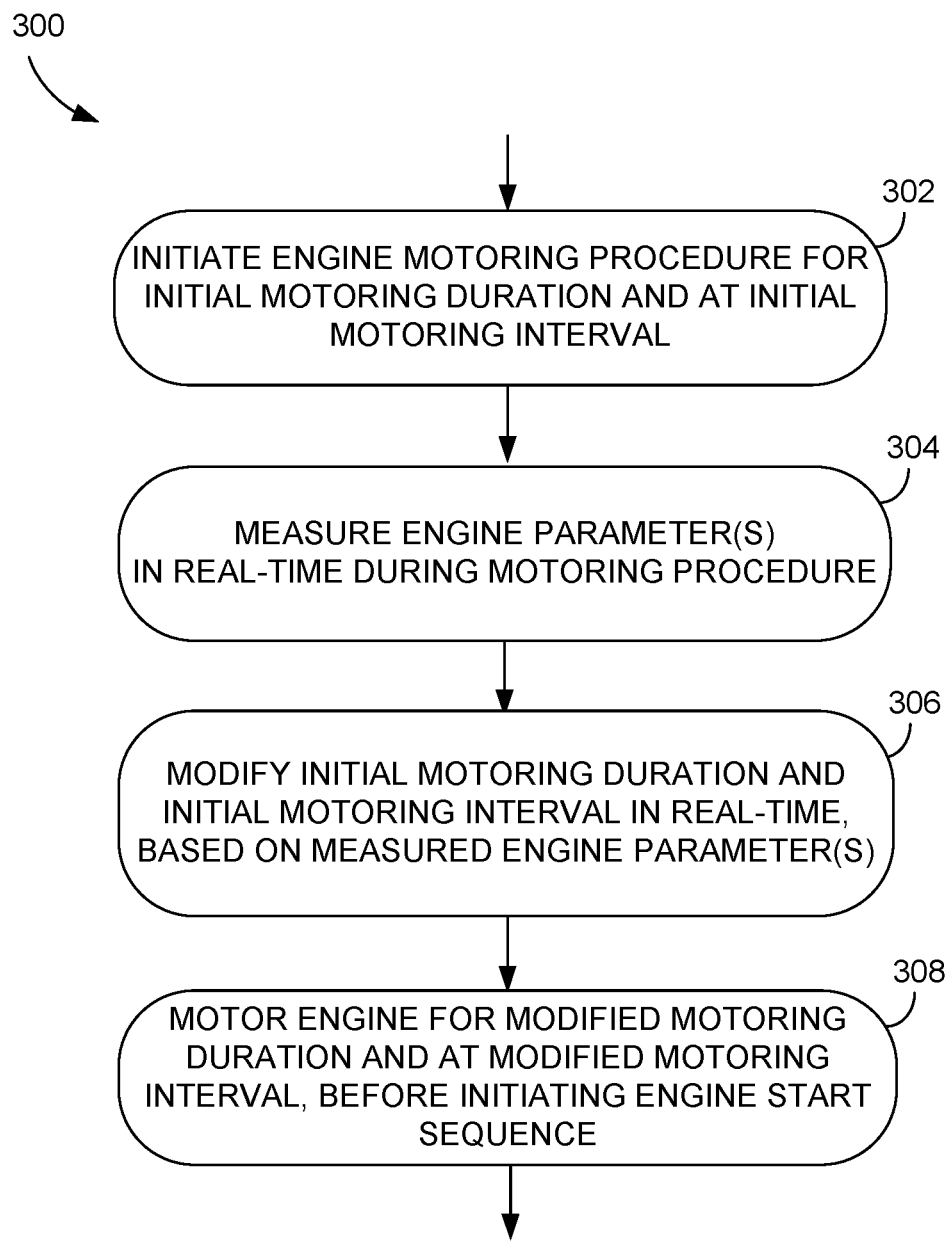
FIG. 3 is a flowchart of a method for dynamic engine motoring, in accordance with an illustrative embodiment.
Figure 4:
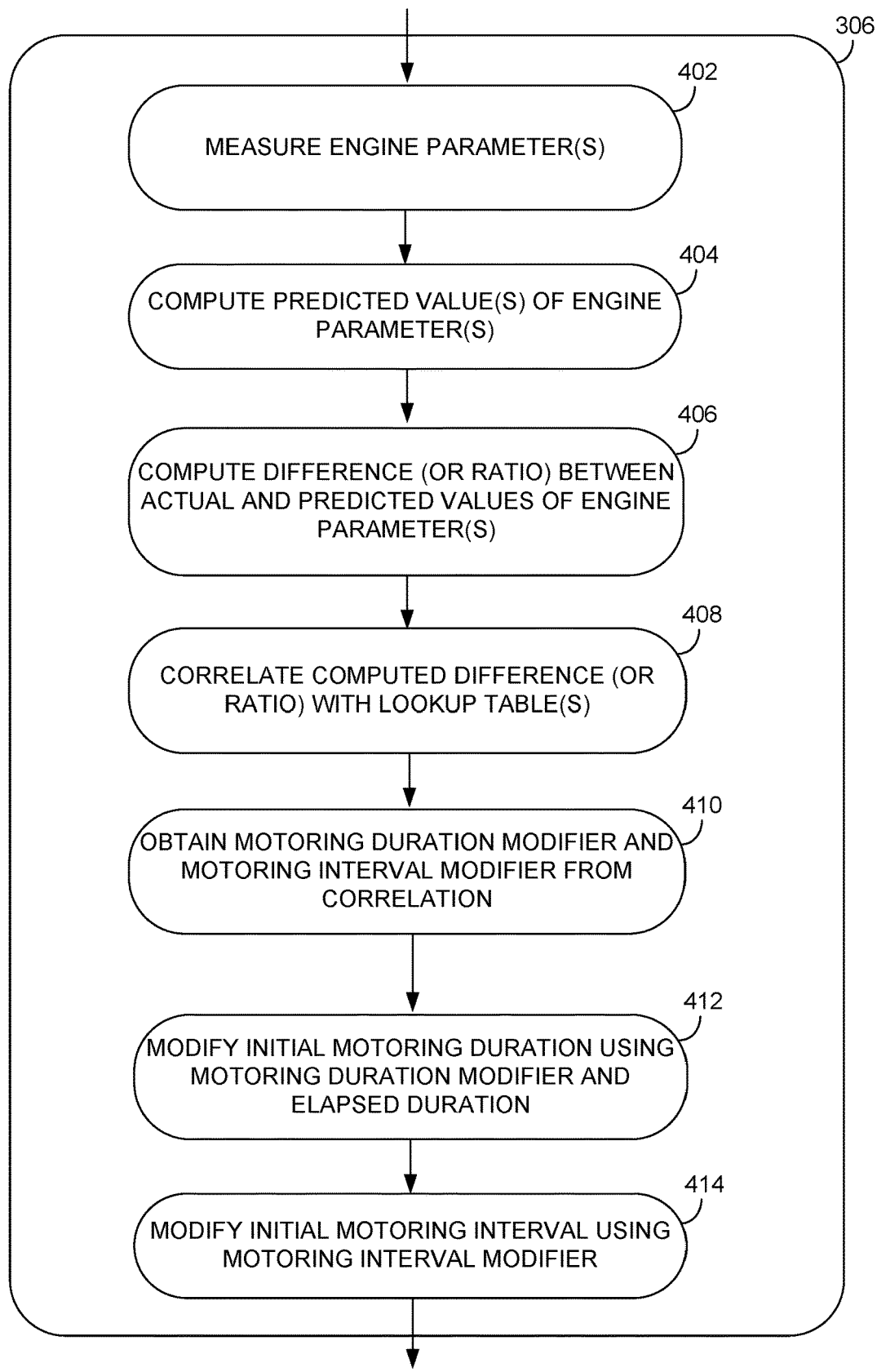
FIG. 4 is a flowchart of the step of FIG. 3 of modifying an initial motoring duration and an initial motoring interval in real-time, in accordance with an illustrative embodiment.

Referring now to FIG. 3 and FIG. 4, an example method 300 for dynamic engine motoring will now be described. The method 300 may be implemented by the computing device 200 of FIG. 2. The method 300 comprises initiating at step 302 a motoring procedure for the engine (reference 10 in FIG. 1A), for an initial motoring duration and at an initial motoring interval. One or more engine parameters (e.g. engine temperature and/or vibration level) are then measured (or tracked) in real time during the motoring procedure (step 304), in the manner described herein above with reference to FIG. 1B. The initial motoring duration and the initial motoring interval are then modified in real-time at step 306, based on the engine parameter(s) measured at step 304. Although not illustrated in FIG. 3, it should be understood that step 306 is repeated in order for the motoring duration and/or interval to be adjusted continually or periodically (e.g., every ten (10) seconds). In other words, it should be understood that step 306 is not only performed once. At step 308, the engine 10 is motored (i.e. the motoring procedure is carried on) for the modified motoring duration and at the modified motoring interval, before initiating an engine start sequence.

Referring now to FIG. 4 in addition to FIG. 3, the step 306 of modifying the initial motoring duration and the initial motoring interval in real-time comprises measuring the engine parameter(s) at step 402 to obtain actual value(s) therefor, computing the predicted value(s) of the engine parameter(s) at step 404, and computing a difference (or a ratio) between the actual and the predicted values of the engine parameter(s) at step 406. The computed difference (or ratio) is then correlated with one or more look-up tables at step 408 and a motoring duration modifier and a motoring interval modifier are obtained from the correlation at step 410, in the manner described above with reference to FIG. 1B. As also described herein above, the initial motoring duration is then modified using the motoring duration modifier and the elapsed duration since the motoring procedure has been initiated (step 412), while the initial motoring interval is modified using the motoring interval modifier (step 414).

Figure 5:
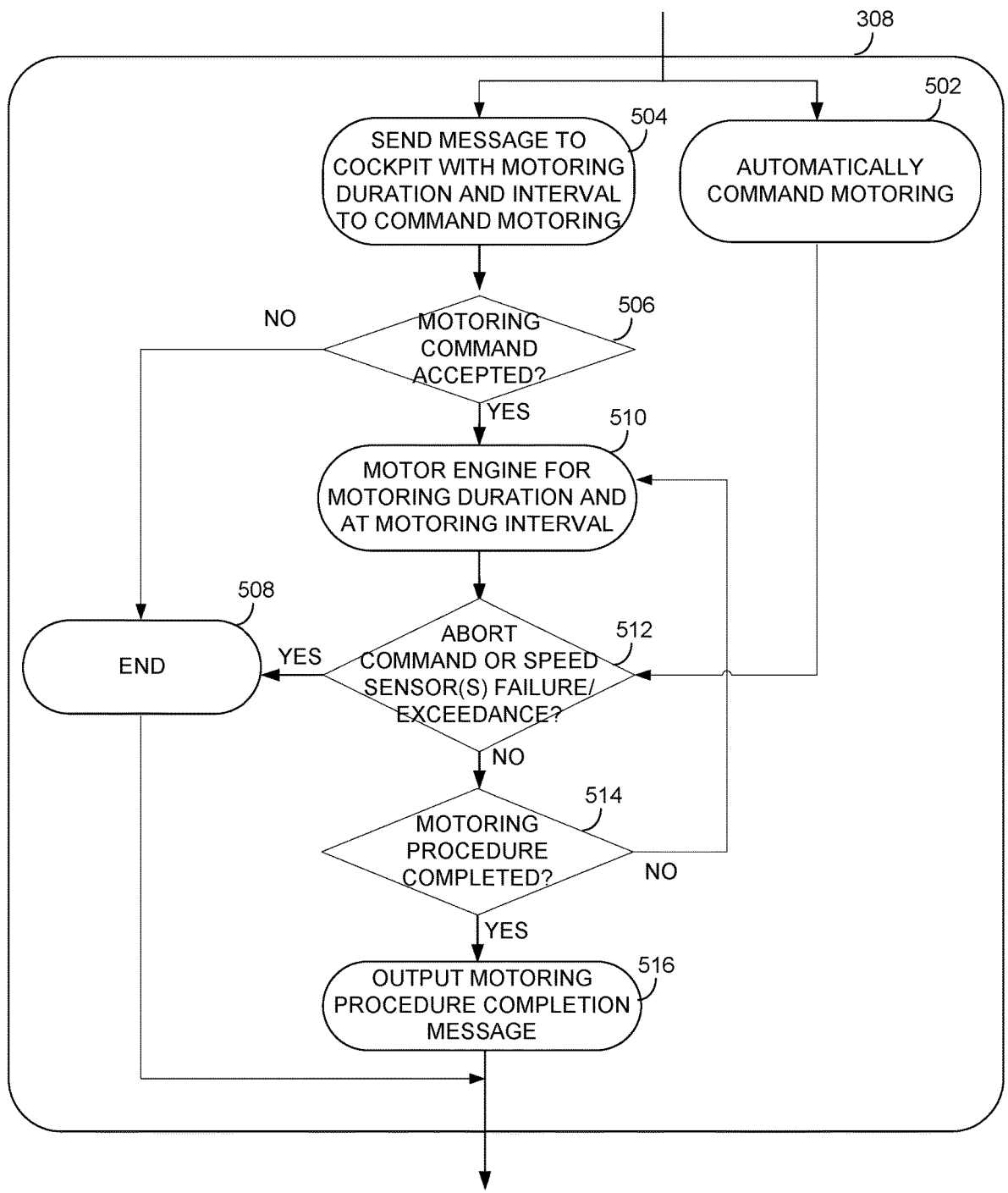
FIG. 5 is a flowchart of the step of FIG. 3 of motoring the engine, in accordance with an illustrative embodiment.

As shown in FIG. 5, step 308 of motoring the engine 10 for the modified motoring duration and at the modified motoring interval illustratively comprises automatically initiating motoring of the engine 10 at step 502. Alternatively, a message may be sent (step 504) to the cockpit to command motoring, the message comprising the modified motoring duration and the modified motoring interval determined at step 306 of FIG. 3. If a message is sent to the cockpit to command motoring, the next step 506 is to assess whether the motoring command has been accepted (e.g., by the pilot). If this is not the case, the motoring procedure is aborted and the method ends at step 508. Otherwise, if it is determined at step 506 that the motoring command has been accepted, the next step 510 is to motor the engine 10 for the modified motoring duration and at the modified motoring interval.

The next step 512 (after step 602 or step 610) may then be to assess whether a pilot-initiated abort command or a failure or exceedance of the engine rotation speed sensor(s) (e.g. an EEC-initiated abort event) has occurred. If this is the case, the motoring procedure is aborted and the method ends (step 508). Otherwise, the next step 514 is to assess whether the motoring procedure has been completed (e.g., the modified motoring duration has elapsed). If this is not the case, the method flows back to step 510 to continue the motoring procedure. Otherwise, a message indicating that the motoring procedure is now complete may be output at step 516. Upon completion of the motoring procedure, starting of the engine 10 may then be initiated.

It should be understood that, while FIG. 5 is illustrated and described herein with reference to step 308 of FIG. 3 (i.e. the step of motoring the engine 10 for the modified motoring duration and at the modified motoring interval), the steps illustrated in FIG. 5 may also apply to step 302 of FIG. 3 (i.e. initiating a motoring procedure for the engine, for an initial motoring duration and at an initial motoring interval). In particular, and as discussed herein above with reference to FIG. 1B, at least steps 602 to 612 may apply when performing step 302, i.e. when the motoring procedure is initiated for the initial motoring duration and at the initial motoring interval.

In one embodiment, the dynamic engine motoring systems and methods described herein may allow for the rotor bow mitigation period (i.e. the motoring duration and/or interval) to be continually adjusted in real-time, based on the value(s) of one or more engine parameters (e.g., engine temperature) during motoring. This may in turn optimize (e.g., reduce) the aircraft's lock-out time and aircraft may take-off sooner.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A dynamic motoring method for an aircraft engine, the method comprising, at a processing device:

initiating motoring of the engine for an initial motoring duration and at an initial motoring interval;

measuring at least one engine parameter in real-time during the motoring, the at least one engine parameter comprising a temperature of the engine;

modifying in real-time, based on a value of the at least one engine parameter during the motoring, the initial motoring duration and the initial motoring interval to obtain a modified motoring duration and a modified motoring interval, the modifying the initial motoring duration and the initial motoring interval in real-time comprising:

performing a correlation between the value of the at least one engine parameter and at least one lookup table to obtain a motoring duration modifier and a motoring interval modifier, the at least one lookup table providing the motoring duration modifier and the motoring interval modifier as a function of the value of the at least one engine parameter; and applying the motoring duration modifier to the initial motoring duration to obtain the modified motoring duration and applying the motoring interval modifier to the initial motoring interval to obtain the modified motoring interval;

continuing the motoring for the modified motoring duration and at the modified motoring interval, the continuing comprising controlling a speed of rotation of the engine using the modified motoring interval; and one of:

measuring an actual value of the at least one engine parameter, computing a predicted value of the at least one engine parameter, and computing a difference between the actual value and the predicted value of the at least one engine parameter, wherein the correlation is performed between the at least one lookup table and the difference as computed; and computing an actual rate of change of the at least one engine parameter computing predicted rate of chance of the at least one engine parameter, and computing a ratio between the actual rate of change and the predicted rate of change, wherein the correlation is performed between the at least one lookup table and the ratio computed.

2. The method of claim 1, wherein the predicted value of the at least one engine parameter is computed based on a predetermined cooling rate for the engine.

3. The method of claim 1, wherein the motoring duration modifier is applied to the initial motoring duration as follows:

$$d_d = (d_i\_d_e) + n_n,$$

where $d_d$ is the modified motoring duration, $d_i$ is the initial motoring duration, $d_e$ is an elapsed duration since the motoring was initiated, and $n_n$ is the motoring duration modifier.

4. The method of claim 1, wherein the motoring interval modifier is applied to the initial motoring interval as follows:

$$i_d = i_i + t_n,$$

where $i_d$ is the modified motoring interval, $i_i$ is the initial motoring interval and $t_n$ is the motoring interval modifier.

5. The method of claim 1, wherein measuring the at least one engine parameter in real-time comprises measuring at least one of an internal temperature of the engine, a vibration level of the engine, and a critical clearance for the engine.

6. The method of claim 1, wherein the motoring is initiated upon detecting a start indication for the engine.

7. The method of claim 3, further comprising initiating a start sequence for the engine once the modified motoring duration has elapsed.

8. A dynamic motoring system for an aircraft engine, the system comprising, at a processing device:
  a memory; and
  a processing unit coupled to the memory and configured for:
    initiating motoring of the engine for an initial motoring duration and at an initial motoring interval;
    measuring at least one engine parameter in real-time during the motoring, the at least one engine parameter comprising a temperature of the engine;
    modifying in real-time, based on a value of the at least one engine parameter during the motoring, the initial motoring duration and the initial motoring interval to obtain a modified motoring duration and a modified motoring interval, the modifying the initial motoring duration and the initial motoring interval in real-time comprising:
      performing a correlation between the value of the at least one engine parameter and at least one lookup table to obtain a motoring duration modifier and a motoring interval modifier, the at least one lookup table providing the motoring duration modifier and the motoring interval modifier as a function of the value of the at least one engine parameter; and
      applying the motoring duration modifier to the initial motoring duration to obtain the modified motoring duration and applying the motoring interval modifier to the initial motoring interval to obtain the modified motoring interval;
    continuing the motoring for the modified motoring duration and at the modified motoring interval, the continuing comprising controlling a speed of rotation of the engine using the modified motoring interval; and one of:
  measuring an actual value of the at least one engine parameter, computing a predicted value of the at least one engine parameter, and computing a difference between the actual value and the predicted value of the at least one engine parameter, wherein the processing unit is configured for performing the correlation between the at beast one lookup table and the difference as computed; and
  computing an actual rate of change of the at least one engine parameter, computing a predicted rate of change of the at least one engine parameter, and computing a ratio between the actual rate of change and the predicted rate of change, wherein the processing unit is configured for performing the correlation between the at least one lookup table and the ratio as computed.

9. The system of claim 8, wherein the processing unit is configured for computing the predicted value of the at least one engine parameter based on a predetermined cooling rate for the engine.

10. The system of claim 8, wherein the processing unit is configured for applying the motoring duration modifier to the initial motoring duration as follows:

$$d_d = (d_{i+} d_e) + n_n,$$

where $d_d$ is the modified motoring duration, $d_i$ is the initial motoring duration, $d_e$ is an elapsed duration since the motoring was initiated, and $n_n$ is the motoring duration modifier.

11. The system of claim 8, wherein the processing unit is configured for applying the motoring interval modifier to the initial motoring interval as follows:

$$i_d = i_i + t_n,$$

where $i_d$ is the modified motoring interval, $i_i$ is the initial motoring interval and $t_n$ is the motoring interval modifier.

12. The system of claim 8, wherein the processing unit is configured for initiating the motoring upon detecting a start indication for the engine.

13. The system of claim 12, wherein the processing unit is further configured for initiating a start sequence for the engine once the modified motoring duration has elapsed.

14. A non-transitory computer readable medium having stored thereon program code executable by a processor for:
  initiating motoring of an aircraft engine for an initial motoring duration and at an initial motoring interval;
  measuring at least one engine parameter in real-time during the motoring, the at least one engine parameter comprising a temperature of the engine;
  modifying in real-time, based on a value of the at least one engine parameter during the motoring, the initial motoring duration and the initial motoring interval to obtain a modified motoring duration and a modified motoring interval, the modifying the initial motoring duration and the initial motoring interval in real-time comprising:
    performing a correlation between the value of the at least one engine parameter and at least one lookup table to obtain a motoring duration modifier and a motoring interval modifier, the at least one lookup table providing the motoring duration modifier and the motoring interval modifier as a function of the value of the at least one engine parameter; and
    applying the motoring duration modifier to the initial motoring duration to obtain the modified motoring duration and applying the motoring interval modifier to the initial motoring interval to obtain the modified motoring interval;

continuing the motoring for the modified motoring duration and at the modified motoring interval, the continuing comprising controlling a speed of rotation of the engine using the modified motoring interval; and one of:
- measuring an actual value of the at least one engine parameter, computing a predicted value of the at least one engine parameter, and computing a difference between the actual value and the predicted value of the at least one engine parameter wherein the correlation is performed between the at least one lookup table and the difference as computed; and
- computing an actual rate of change of the at least one engine parameter, computing a predicted rate of change of the at least one engine parameter, and computing a ratio between the actual rate of change and the predicted rate of change, wherein the correlation is performed between the at least one lookup table and the ratio as computed.

* * * * *